(No Model.)
E. H. HUENEFELD.
HEAT DEFLECTOR AND EQUALIZER FOR OVENS.
No. 563,928. Patented July 14, 1896.
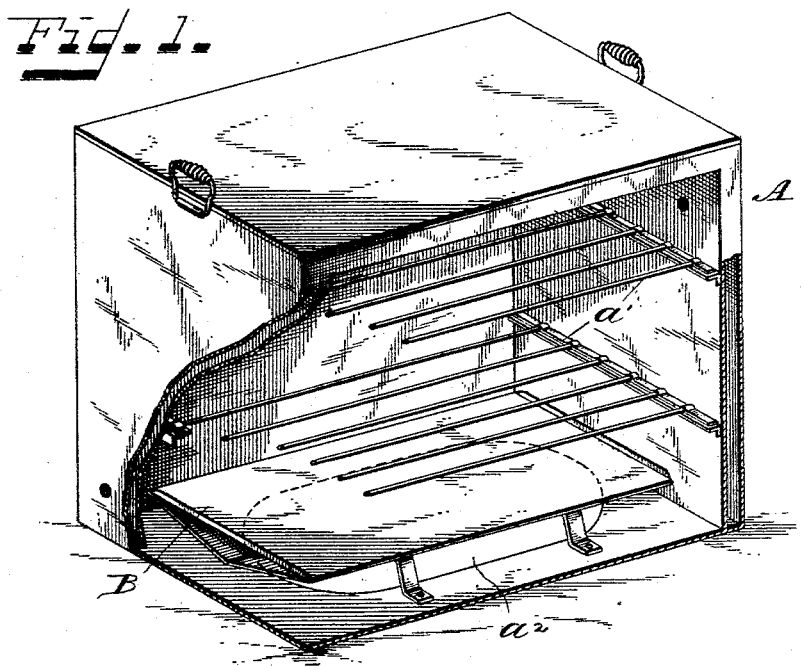
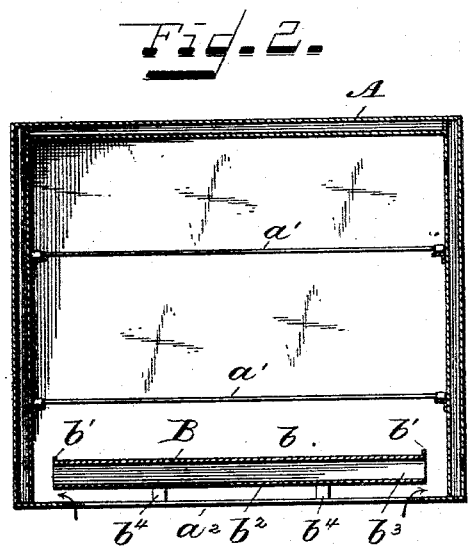
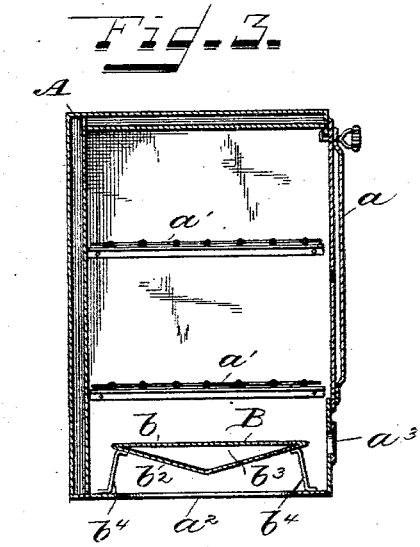
Witnesses:
John R. Carter
J. Thomson Cross
Inventor.
Ernst H. Huenefeld
by James H. Ramsey
his Attorney.

UNITED STATES PATENT OFFICE.

ERNST H. HUENEFELD, OF CINCINNATI, OHIO.

HEAT DEFLECTOR AND EQUALIZER FOR OVENS.

SPECIFICATION forming part of Letters Patent No. 563,928, dated July 14, 1896.

Application filed November 11, 1895. Serial No. 568,605. (No model.)

*To all whom it may concern:*

Be it known that I, ERNST H. HUENEFELD, a citizen of the United States, residing at Cincinnati, in the county of Hamilton and State of Ohio, have invented a new and useful Improvement in Heat Deflectors and Equalizers for Ovens, of which the following is a specification.

My invention relates to a novel device for deflecting and equalizing the heat in cooking-ovens, and particularly in domestic or portable ovens.

The object of my invention is to deflect and diffuse the heat from gas, gasolene, vapor, and other similar stoves to all parts of the oven as soon as it enters the open bottom of the oven from the stove, and especially to prevent the bottom part of the oven from becoming too hot, or heated to a greater degree than other parts of the oven; and it consists in providing an open-bottom oven with a triangular-shaped deflector, having a flat horizontal top and angular or convex shaped bottom, with intermediate open air space or conduit lengthwise of the deflector and oven just above and over the opening in the bottom of the oven and beneath the lower shelf thereof, with sufficient space between each side and end of the deflector and oven to permit the heat to pass upwardly and around the deflector at all points alike, and in the other features of novelty set forth.

In the drawings, Figure 1 is a perspective view of an oven partly broken away in front and at one end to show the deflector and its position in the oven. Fig. 2 is a central longitudinal section of the oven and deflector, showing the relative position of the latter with reference to the ends of the oven. Fig. 3 is a central transverse section of the oven and deflector, showing the relative position of the latter with reference to the sides of the oven.

While my deflector is adapted for use in any oven having an open bottom I have shown it in connection with a domestic or portable oven, in which A represents the oven; $a$, the oven door; $a'$, the wire shelves of the oven supported in any suitable manner; $a^2$, the opening in the bottom of the oven, and $a^3$ the circular isinglass window through which to observe the fire or flame of the stove.

I prefer to construct my heat deflector and equalizer B, substantially as shown in the drawings, with flat horizontal upper surface or top $b$, having upturned ends $b'$ to strengthen it, angular-shaped bottom $b^2$, air-conduit $b^3$, and legs $b^4$, but, if desired, the bottom may be convex instead of angular-shaped.

The deflector is preferably constructed of sheet metal by turning the side edges of the rectangular flat top $b$ over the corresponding edges of the angular-shaped bottom $b^2$ and attaching legs $b^4$ with rivets to each side thereof to support the deflector a short distance above the bottom of the oven.

An important and distinguishing feature of my invention is the open air passage or conduit in the deflector to give free and uninterrupted circulation of the heated air therein, allowing it to pass through from end to end and escape at either end, thus preventing the heat from becoming too intense immediately above the deflector. The horizontal area of the deflector is substantially smaller than the horizontal interior area of the oven to provide an open space between the sides and ends of the deflector and oven to allow the deflected heat and air to rise simultaneously at the sides and ends of the oven.

The oven is provided in its inner walls near its top with escape-openings, which discharge into the chamber between the walls, while the outer walls are provided near their bottoms with openings. With this construction it will be seen that the products of combustion as they pass into the oven, instead of passing over the deflector and into contact with the food therein, pass upwardly and escape through the upper orifices into the space between the walls of the oven.

The flat horizontal top plate of the deflector maintains an even and equal temperature because of the free and uninterrupted circulation of air through the conduit of same and because of the angular or convex shaped bottom which divides and deflects the heat toward the sides and ends of the oven, thereby giving an equal distribution of heat to all parts of the oven alike and preventing an accumulation of excessive heat immediately above the deflector.

The advantages of my device are simplicity and cheapness of construction, economy of heat by the equal and even distribution and diffusion of the same, durability of the deflector because of its angular or convex shape and the open-air passage which prevents overheating of top plate, and its adaptability to any style or size of open-bottom oven.

I claim—

As a new article of manufacture a cooking-oven having double side and end walls and an opening in its bottom, and a heat-deflector having a flat top and double inclined bottom with open ends, the said deflector being triangular in cross-section and of greater length and width than the length and width of the opening in the bottom and secured to the bottom plate of the oven by legs, the inner end walls of the oven having openings near their top, substantially as set forth.

ERNST H. HUENEFELD.

Witnesses:
JAMES N. RAMSEY,
JOHN R. CARTER.